June 18, 1968 L. J. HIGGINS 3,388,846

CAPSTAN ARRANGEMENT FOR MAGNETIC TAPE TRANSPORTS

Filed May 12, 1966 2 Sheets-Sheet 1

INVENTOR
LEONARD J. HIGGINS
BY Laurence J. Marhoefer
ATTORNEY

CAPSTAN ARRANGEMENT FOR MAGNETIC TAPE TRANSPORTS

Filed May 12, 1966 2 Sheets-Sheet 2

INVENTOR
LEONARD J. HIGGINS
BY
Laurence J Marhoefer
ATTORNEY

United States Patent Office 3,388,846
Patented June 18, 1968

3,388,846
CAPSTAN ARRANGEMENT FOR MAGNETIC TAPE TRANSPORTS

Leonard J. Higgins, Smithtown, N.Y., assignor to Potter Instrument Company, Inc., Plainview, N.Y., a corporation of New York Filed May 12, 1966, Ser. No. 549,554
7 Claims. (Cl. 226—97)

ABSTRACT OF THE DISCLOSURE

This specification and drawings describe a magnetic storage device employing endless tape loops in which the loops are driven by a capstan outside the loop and the length of the loop is less than the diameter of the capstan.

This invention relates to an improved capstan arrangement for driving closed loops of magnetic, information storage tape, and, more particularly, to an improved capstan arrangement for circulating at a high speed closed loops of magnetic tape used in a direct access memory system.

In a magnetic tape direct access memory system known in the prior art, closed loops of tape circulate continuously at high speed past a transducer which records information on and reads from a magnetic coating on the surface of the tape. The loops are relatively small and the amount of information which can be stored on them is therefore limited. However, each loop circulates in a fraction of a second so that the time required for any given block of information stored on the tape to reach the transducer is only a fraction of a second.

Closed loop, magnetic tape, direct access memory systems and other closed loop magnetic tape memory systems known in the prior art employ a rotating capstan positioned inside the loop to drive the tape. The problem with this arrangement, particularly in respect of direct access memory systems, is that a very high capstan speed is required to circulate a relatively long tape loop at high speed since, with the capstan inside the loop, the revolutions per second (r.p.s.) of the closed loop cannot exceed the r.p.s. of the capstan. Moreover, as a practical matter, the r.p.s. of the loop is, in fact, necessarily much lower than that of the capstan.

One object of this invention is the provision of an improved capstan drive arrangement for circulating closed loops of magnetic tape at high speed with a relatively low speed capstan.

Another object of the invention is to provide a capstan arrangement for driving closed loops of magnetic tape in which the r.p.s. of the loops can equal or exceed the r.p.s. of the capstan.

A further object of this invention is the provision of a capstan drive arrangement which permits a single capstan to drive a greater number of closed loops than can be driven with arrangements known in the prior art.

Still another object of this invention is the provision of a capstan arrangement for driving closed loops of magnetic tape which permits the loops to be positioned with respect to the capstan and removed therefrom rapidly and easily.

Briefly, this invention contemplates the provision of a capstan arrangement for driving a closed loop of magnetic information storage tape in which the capstan is located outside the closed loop of tape. The tape loop is preferably airborne and is guided so that its outer surface frictionally engages the surface of the capstan. In a preferred embodiment, the magnetic coating is on the inner surface of the tape and a transducer for reading and recording information on the tape is disposed within the loop.

Having briefly described this invention, it will be described in greater detail along with other objects and advantages in the following detailed description of a preferred form which may be best understood by reference to the accompanying drawings in which like reference numerals denote like parts in various views, and in which.

Figure 1:
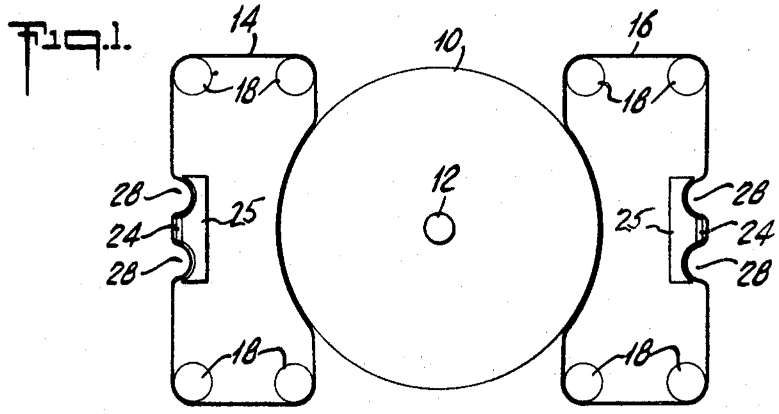
FIGURE 1 is a schematic view of one embodiment of a capstan arrangement constructed in accordance with the teachings of this invention.

Referring now to FIGURE 1 of the drawings, two coplanar closed loops of tape 14 and 16 are positioned with their outer surfaces frictionally engaging the surface of a capstan 10. A shaft 12 supports the capstan 10 and a suitable motor known in the art (not shown) is adapted to rotate the capstan about the axis shaft of shaft 12. A generally rectangular array of four air bearings 18 known in the art is disposed inside each of the loops 14 and 16 to guide the loops and render the loops airborne. It will be understood that bearings 18 may include ports from which jets of air issue to form a film of air which supports the tape. Alternatively, the surface of the bearing may be so formed that the loops 14 entrain air as they circulate, forming a film of air which supports the tape.

The tapes 14 and 16 are made from a thing flexible material such as Mylar, a registered trademark of E. I. du Pont de Nemours & Co., Inc., and are coated on one surface with a magnetic material such as ferrous oxide. Advantageously, the magnetic coating is on the inner surface of the loops so that the capstan 10 does not disturb it. A transducer 24 for reading information from and recording information on the loops 14 and 16 is mounted adjacent the inner surface of each loop by means of a suitable supporting block 25 known in the art. If desired, small vacuum buffers 28 may be provided on either side of the transducers 24 in order to guide the tapes in the region of the transducers.

In operation, the loops 14 and 18 are borne by a film of air established between the inner surface of the tape and the surface of bearings 18. Capstan 10 is driven in a clockwise direction at a constant speed *w*, for example, circulating loop 16 in a counterclockwise direction and loop 14 in a clockwise direction at respective rates which are a function of the capstan speed *w* and the ratio of the circumference of the capstan to the length of the closed loop.

It should be noted that the air bearings 18 do not disturb the oxide coating on the tape loops since the tapes do not contact the surface of these bearings. Additionally, it should be noted that a substantial portion of the tapes 14 and 16 contact the capstan 10, providing good frictional engagement between the capstan and the tapes.

Figure 2:
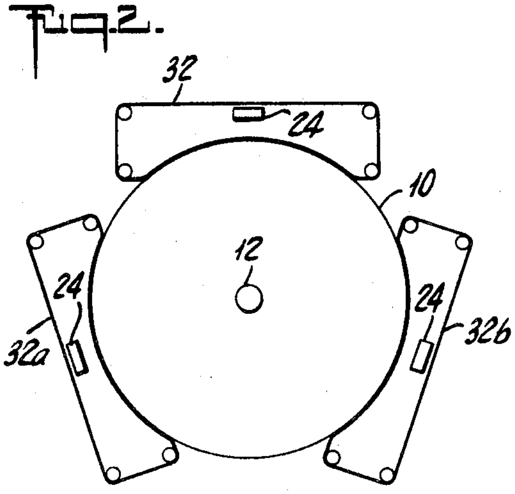
FIGURE 2 is a schematic view of another embodiment of a capstan arrangement of this invention.

Referring now to FIGURE 2, three co-planar closed loops 32, **32*a* and 32*b* are arranged to be driven by the capstan 10. The length of each of these loops is less than the circumference of the capstan 10 and the r.p.s. of each loop consequently exceeds that of the capstan 10. As will be appreciated readily, more than three co-planar loops can be arranged about a capstan 10**; alternatively, the novel capstan arrangement may also be employed to drive a single tape loop if desired.

Figure 4:
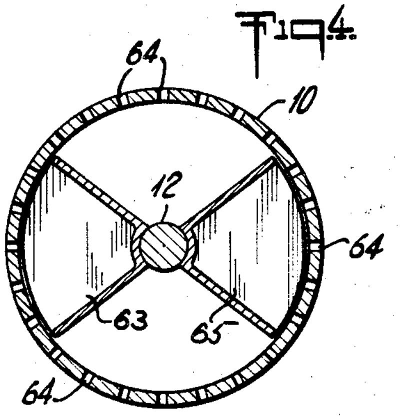
FIGURE 4 is a sectional view of a vacuum capstan used in the system of FIGURE 3.
Figures 3, 5, 7:
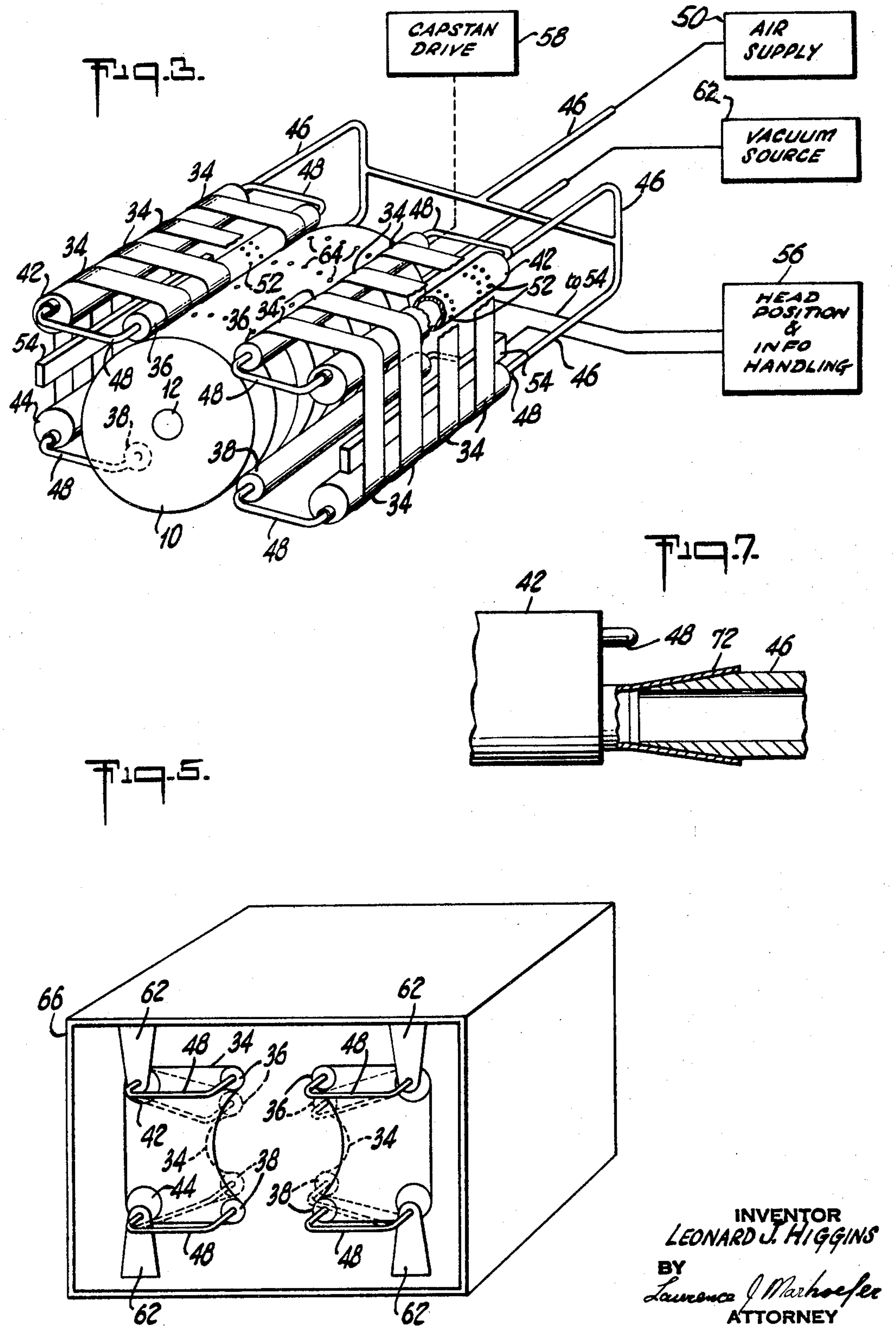
FIGURE 3 is a schematic, perspective view of an embodiment of a capstan arrangement for a direct access memory system.
FIGURE 5 is a schematic side view of an embodiment of a support or cartridge which facilitates handling groups of closed tape loops.
FIGURE 7 is a detailed, sectional view of a detachable connector suitable for use with the direct access memory of FIGURE 3.

Referring now to FIGURES 3 and 4, a direct access memory constructed in accordance with the teachings of this invention has a set of four tape loops 34 arranged on each side of a vacuum capstan 10. A generally rectangular arrangement of air bearings 36, 38, 42 and 44 guide the loops 34 on each side of the capstan so that a substantial portion of the outer surface of each loop contacts the surface of the capstan.

The hollow capstan 10 is formed with a plurality of ports 64 and is driven in a counterclockwise direction, for example, by a capstan drive motor 58. A vacuum pump 62 withdraws air from stationary chambers 63 and 65 journaled to the shaft 12, thereby creating a suction at the ports 62 in the region of the chamber. This suction draws the loops 34 into tight frictional engagement with the capstan. It should be noted that the capstan 10 rotates relatively to the chambers 63 and 65 which are stationary and that the walls of the chambers block the suction from the ports not adjacent the chambers. This arrangement releases the tape from the capstan 10 in the region of the bearing 38.

Ducts 46 couple the bearings 42 and 44 which are remote from the capstan to an air pump 50 which supplies air under pressure to these bearings. Pressurized air is supplied to the bearings 36 and 38 adjacent the capstan 10 by ducts 48 coupled from each end of the bearings 42 and 44. Air issues from a plurality of ports 52 in the bearings 36, 38 and 42 and 44 and forms a film which supports and guides the tape 34 out of contact with the surface of the bearings.

Since the exterior surface of the loops 34 contact the capstan 10, the magnetic coating is preferably on interior surfaces of each tape, and transducers for recording information on and reading information from loops 34 are therefore mounted in headers 54 inside the closed loop 34. If desired, a guide (not shown) may be positioned outside the tape loops opposite the headers 54 in order to precisely guide the tape as it passes the transducers.

As will be appreciated by those skilled in the art, advantageously, there are more information tracks on the tapes 34 than there are transducers in the headers 54. In such a case, the headers are moved laterally with respect to the tape loops 34 by a suitable head positioning apparatus 56 known in the art in order that a single transducer may be positioned to read from or record information in more than one track on the tape.

In a direct access memory it is advantageous to employ a frame or cartridge which permits the tape loops to be moved into position easily with respect to the capstan 10 and to be moved therefrom. Such a frame permits one set of tapes to be replaced quickly and easily by another. FIGURE 5 shows one suitable frame. There the remote bearings 42 and 44 are supported by brackets 62 and 64 respectively which are secured to a rigid frame 66. Preferably, the ducts 48 are mounted so that they are free to pivot to a position such as that indicated by the dotted lines in FIGURE 4. In this position, the loops 34 can be disengaged easily from the surface of the capstan 10. A suitable latch (not shown) may be provided to lock the ducts 48 in position with the tapes 34 properly engaging the capstan 10.

Figure 6:
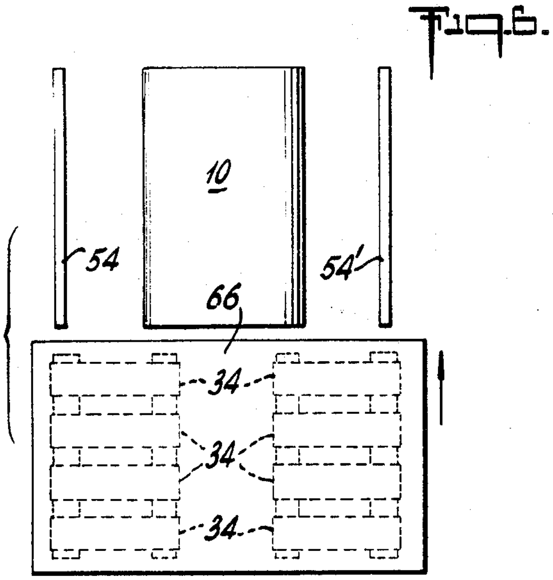
FIGURE 6 is a schematic, plan view showing the cartridge of FIGURE 4 about to be positioned with respect to the capstan shown in FIGURE 3.

FIGURE 6 shows the relative positions of the transducer headers 54, the capstan 10 and the frame 66 as tapes are being loaded about the capstan. Preferably, the bearings 42 and 44 each have suitable fittings which automatically engage a duct 46 when the frame 66 is pushed into position. FIGURE 7 shows one suitable fitting which includes a flared fitting 72 adapted to telescopically receive and engage a conical nozzle at each end of the bearings 42 and 44.

Figure 8:
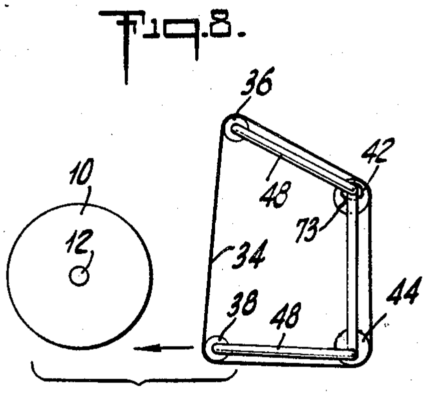
FIGURE 8 is a schematic side view of an alternate embodiment of a cartridge.

FIGURE 8 shows a frame which can be used in a direct access memory where provision is made to withdraw headers 54 to a position clear of the capstan. In this case, the tapes 34 may be positioned by moving them laterally with respect to the capstan 10 as indicated by the arrow in FIGURE 7. In FIGURE 8, a frame member 82 supports the remote bearings 42 and 44, and a suitable spring biased mount 73 known in the art pivotally connects the ducts 48 to bearings 42 and 44. The spring bias of mount 73 urges the duct 48 to the position shown in FIGURE 7. With the tape loops 34 in position with respect to the capstan 10, the ducts 48 are substantially horizontal and the spring bias tensions the tape, providing firm frictional engagement between the tape and the surface of the capstan.

Having thus described the invention, what is desired to be secured by Letters Patent is pointed out in the following claims.

What is claimed is:

1. An improved capstan arrangement for driving a closed loop of magnetic tape, comprising in combination:
- means for guiding a closed loop of magnetic tape,
- a capstan,
- means mounting said capstan outside the loop guided by said guide means with said capstan disposed to frictionally engage the outer surface of the loop of tape,
- the length of tape which comprises said closed loop of magnetic tape being less than the circumferential length of said capstan, whereby said capstan is adapted to circulate said loop at a speed which exceeds the rotation speed of said capstan.

2. An improved capstan arrangement as in claim 1 wherein said guide means includes means disposed within said loop for making the loop airborne.

3. An improved capstan arrangement for driving a plurality of closed loops of magnetic tape, comprising in combination:
- a plurality of closed loops of magnetic tape,
- means for guiding each of said tape loops,
- a capstan,
- means mounting said capstan outside each of said loops,
- said guide means guiding said plurality of said loops so that the outer surface of said plurality of loops simultaneously engage the surface of said capstan at respective different locations thereon, and
- the length of tape which comprises each of said closed loops of magnetic tape being greater than the circumferential length of said capstan.

4. An improved capstan arrangement as in claim 3 wherein at least two of said plurality of loops have a common plane passing through the longitudinal center line of said loops.

5. An improved capstan arrangement as in claim 4 wherein said guide means includes means for making each of said plurality of loops airborne.

6. An improved capstan arrangement as in claim 5 wherein the length of at least one of said loops is less than the circumference of the capstan.

7. An improved capstan arrangement as in claim 4 wherein said guide means includes a plurality of air bearings inside said closed loops.

References Cited

UNITED STATES PATENTS

| | | | |
|---|---|---|---|
| 3,019,884 | 2/1962 | Bartelt | 226—95 X |
| 3,281,039 | 10/1966 | Foley | 226—95 |
| 3,314,729 | 4/1967 | Baumeister et al. | 226—97 X |
| 3,315,861 | 4/1967 | Metzger | 226—97 X |

ALLEN N. KNOWLES, *Primary Examiner.*